Figure 1:
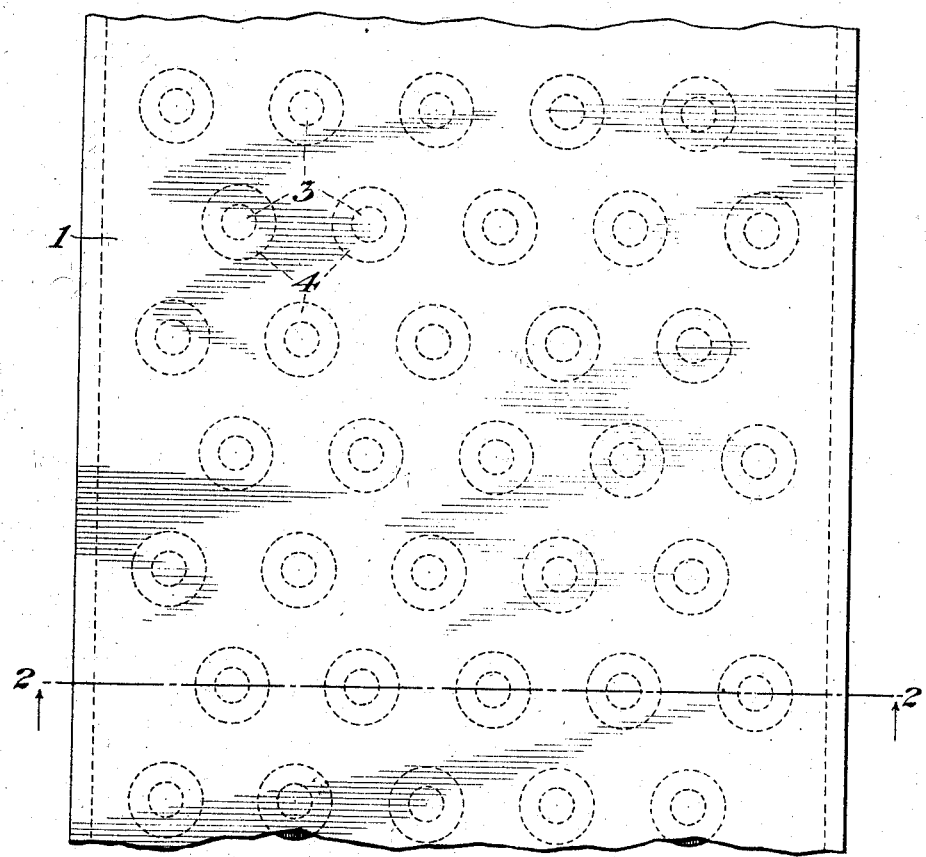

No. 846,534. PATENTED MAR. 12, 1907.
J. J. VOORHEES.
MATERIAL FOR FLEXIBLE WEARING SURFACES.
APPLICATION FILED AUG. 25, 1905.

UNITED STATES PATENT OFFICE.

JOHN J. VOORHEES, OF JERSEY CITY, NEW JERSEY.

MATERIAL FOR FLEXIBLE WEARING-SURFACES.

No. 846,534.     Specification of Letters Patent.     Patented March 12, 1907.

Application filed August 25, 1905. Serial No. 275,756.

*To all whom it may concern:*

Be it known that I, JOHN J. VOORHEES, a citizen of the United States, residing in Jersey City, county of Hudson, and State of New Jersey, have invented certain new and useful Improvements in Material for Flexible Wearing-Surfaces, of which the following is a full, clear, and exact specification.

My invention relates to certain new and useful improvements in composition materials, and while it is adapted for use in various ways it will be found especially valuable in the manufacture of conveyer-belts, vehicle-tires, and other structures having wearing-surfaces where flexibility and resistance to wear are desired.

In the drawings I have shown my invention as applied to a conveyer-belt such as are now largely used for moving various products—such as coal, ore, crushed rock, and the like—from one point to another, and for this purpose I have found it very valuable.

As will be readily understood, the friction which occurs when a heavy body, such as ore, falls from a place of rest upon the moving belt is very great and very destructive to the wearing-surface. At the same time the belt must possess sufficient flexibility to readily follow the drums upon which it turns; and it is the object of my invention to produce a material which will have the necessary flexibility and yet one which will resist the wear and tear to the highest degree. Various efforts have heretofore been made to produce a composition structure having these desirable qualities, and several attempts have been made to utilize metal sections of various kinds to receive the wear in connection with material possessing the required flexibility. All of these attempts, however, have been more or less unsuccessful by reason of the difficulty of combining metal and flexible material so as to produce a desirable and efficient structure; and my invention consists in so disposing and arranging the parts and designing their proportions as to obtain this necessary adhesion.

Figure 2:
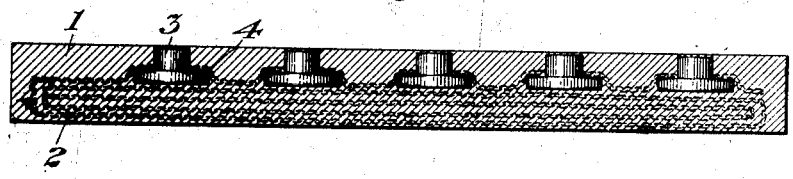

In the drawings illustrating one form of my invention, Figure 1 is a top view of the belt, and Fig. 2 a section taken on lines 2 2 of Fig. 1.

The material consists, essentially, of a cementing medium 1, in which is embedded one or more layers of cloth fabric 2. The cloth is completely saturated with and embedded in the cementing medium which separates one layer from another, and I prefer to employ several layers running longitudinally of the belt and to locate them near the lower or pulley surface thereof. In the upper part of the belt—that is, near its upper or wearing surface—I dispose metallic studs having comparatively short shanks of small diameter and large flat heads and arrange them perpendicularly to the structure of the belt, the heads being held firmly beneath one of the layers of fabric and the opposite ends or shanks being situated adjacent to the upper surface, where they will form part of the wearing-surface when the structure is put to use.

In Fig. 2 the upper layer and the studs are shown entirely surrounded and embedded in the cementing medium 1. The cementing medium which I prefer to use is rubber, and when this is used the studs are embedded therein previous to vulcanization, so as to be vulcanized in place; but any other suitable material may be used which performs the necessary functions.

The studs should be disposed close enough together to practically form the wearing-surface, and it is necessary that the studs have comparatively large heads and small short shanks, so that the lateral or tipping tendency which is produced by the fall of the heavy ore upon the moving belt be entirely resisted. This has been one of the greatest difficulties in constructing composition fabrics, as the natural adhesion of the unlike substances is more or less slight, and it is only by providing the greatest possible contacting surface between the unlike substances that this tendency may be overcome.

In using my improved material for the manufacture of vehicle-tires the side of said material referred to above as the "lower" or "pulley" surface will be the inner surface of the tire, and that designated as the "upper" or "wearing" surface will be the outer surface or tread of the tire.

It is evident that many slight modifications may be made in my invention without departing from the spirit thereof; but

What I claim, and desire to secure by Letters Patent, is—

1. As a new article of manufacture, a material for belting and the like comprising a body of cementing material, strengthening material embedded in said cementing material, and a plurality of metallic studs having short, small shanks, and large, flat heads embedded in the cementing medium, the shank of said stud being adapted to form part of the wearing-surface of the fabric, and the flat head being secured beneath the strengthening fabric and adjacent thereto, so as to be held securely thereby, substantially as described.

2. As a new article of manufacture, a material for belting and the like comprising a body of cementing medium, a plurality of layers of strengthening fabric embedded in said cementing material, and a plurality of metallic studs having short, small shanks, and large, flat heads embedded in the cementing medium, the shank of said stud being adapted to form part of the wearing-surface of the fabric, and the flat head being secured beneath the one or more layers of the strengthening fabric and adjacent thereto, so as to be held securely thereby, substantially as described.

3. As a new article of manufacture, a material for belting and the like comprising a body of cementing medium, a plurality of layers of strengthening fabric embedded in said cementing material, and a plurality of metallic studs having short, small shanks, and large, flat heads, the shank of said stud being adapted to form part of the wearing-surface of the fabric, and the flat head being secured firmly between two adjacent layers of said strengthening fabric, so as to be held securely thereby, substantially as described.

In testimony whereof I have hereunto set my hand in the presence of two subscribing witnesses.

JOHN J. VOORHEES.

Witnesses:
ADOLPH F. DINSE,
A. C. FISCHER.